United States Patent [19]

Hasegawa

[11] 4,450,506
[45] May 22, 1984

[54] AUTOMATIC LIGHT-QUANTITY-CONTROL SPEED LIGHT

[75] Inventor: Hiroshi Hasegawa, Tokyo, Japan
[73] Assignee: Nippon Kogaku K.K., Tokyo, Japan
[21] Appl. No.: 486,298
[22] Filed: Apr. 25, 1983

Related U.S. Application Data

[63] Continuation of Ser. No. 214,886, Dec. 10, 1980, abandoned.

[30] Foreign Application Priority Data

Dec. 27, 1979 [JP] Japan .............................. 54-171444

[51] Int. Cl.³ .............................................. G03B 15/02
[52] U.S. Cl. ........................................ 362/4; 362/5;
315/241 S; 354/413; 354/127.1; 354/145.1
[58] Field of Search .............................. 362/5, 4, 10;
315/241 S; 354/30, 33, 35

[56] References Cited

U.S. PATENT DOCUMENTS 3,706,911 12/1972 Wilwerding ....................... 315/158
4,078,240 3/1978 Kaneko .................................. 362/4

Primary Examiner—Donald P. Walsh
Attorney, Agent, or Firm—Shapiro and Shapiro

[57] ABSTRACT

An automatic light-quantity-control speed light which is capable of operating in a direct or an indirect illumination mode incorporates a device for indicating, prior to an exposure, whether or not light quantity control is possible in the direct illumination mode, and for indicating, subsequent to an exposure, whether or not a light quantity control operation occurred during an exposure in the indirect illumination mode. The device includes a first detecting circuit for determining whether or not the guide member determined by preset exposure factors is outside of the guide number range in which light quantity control can be effected and a second detecting circuit for detecting whether or not a light quantity control operation occurs during an exposure. A display circuit is connected to the first detecting circuit in the direct illumination mode, and is connected to the second detecting circuit in the indirect illumination mode. The display circuit may be automatically connected to the appropriate detecting circuit in accordance with the illumination mode in which the speed light is operated.

15 Claims, 5 Drawing Figures

AUTOMATIC LIGHT-QUANTITY-CONTROL SPEED LIGHT

BACKGROUND OF THE INVENTION

This application is a continuation of Ser. No. 061,214,886 filed 12/10/80, now abandoned.

The present invention relates generally to an automatic light-quantity-control speed light (electronic flash unit), and more particularly to a device for indicating prior to an exposure whether a proper exposure is possible and for indicating subsequent to an exposure whether a proper exposure was obtained.

When using an automatic light-quantity-control speed light for flash photography, the quantity of light emitted by the speed light is controlled in accordance with preset exposure factors, e.g., film speed, lens aperture and object distance, to ensure a proper exposure. A typical speed light of this type includes a flash discharge tube adapted to consume the charge stored in a main discharge capacitor and to emit light, a light receiving element adapted to receive a portion of the light from the flash discharge tube which is reflected by the object being photographed and to vary its resistance in accordance with the quantity of light received, and a thyristor (SCR) disposed in the discharge path between the flash discharge tube and the main discharge capacitor. When the integrated value of the current flowing to the light receiving element reaches a predetermined value which is determined by the preset exposure factors, the thyristor is turned off to block the discharge of the main discharge capacitor through the flash discharge tube, thereby stopping the light emission from the flash discharge tube. By controlling the light emission time of the flash discharge tube, the quantity of light emitted therefrom is controlled so that a proper exposure can be obtained.

Where the object being photographed lies at a relatively long distance, the quantity of light reflected by the object is small. Accordingly, light emission from the flash discharge tube may be terminated before an adequate quantity of reflected light is obtained for a proper exposure, i.e., the capacitor may completely discharge through the flash discharge tube before the current flowing to the light receiving element reaches the predetermined value set by the preset exposure factors. Thus, light quantity control is not effected, and under-exposure results. Unless a light quantity control operation is confirmed (or its non-occurrence otherwise indicated) under-exposure cannot be discovered until the film is developed.

To avoid this problem, U.S. Pat. No. 3,706,911 discloses a device which detects that the thyristor has been turned off (or that the integrated value of the photocurrent to the light receiving element has reached the predetermined value) and indicates by a display the occurrence of light quantity control immediately after an exposure is made. However, the display is not preventive in nature, i.e., before the fact, and this leads to the possibility of losing an important photograph due to under-exposure. Japanese Patent Publication No. 1204/1974 discloses another device which indicates prior to an exposure that the guide number determined by the preset aperture value, object distance, and film speed is outside of a range of guide numbers in which light quantity control is possible, thereby preventing a wasted exposure and the loss of an important photograph.

Some automatic light-quantity-control speed lights may be operated in two different object illumination modes, i.e., a direct illumination mode in which an object is illuminated directly by the light emitted from the speed light, and an indirect illumination mode in which the object is indirectly illuminated by light from the speed light which is reflected from a ceiling or a wall. In the direct illumination mode, the success or failure of light quantity control can be conveniently indicated before an exposure. However, in the indirect illumination mode it is very difficult to determine in advance the quantity of light which will be reflected by the object. Therefore, as a practical matter, the success or failure of light quantity control can only be determined after an exposure has been completed.

Heretofore, there has been no prior art device capable of operating in an optimum manner in both the direct and indirect illumination modes for indicating the success or failure of light quantity control. Prior art devices have not taken into consideration the essential differences between the preventive indication, i.e., prior to an exposure, of the impossibility of light quantity control and the cautionary indication, i.e., after an exposure, of the non-occurrence or failure of light quantity control. Accordingly, prior speed lights have been incapable of operating efficiently in both illumination modes.

BRIEF SUMMARY OF THE INVENTION

Accordingly, a principal object of the invention is to provide an automatic light-quantity-control speed light which operates in an optimum manner in both direct and indirect illumination modes for indicating the success or failure of light quantity control.

Another object of the invention is to provide an automatic light-quantity-control speed light which gives a preventive indication of the impossibility of light quantity control prior to an exposure in the direct illumination mode, and which gives an indication of the non-occurrence of light quantity control immediately after an exposure in the indirect illumination mode.

A further object of the invention is to provide an automatic light-quantity-control speed light which automatically switches between different modes of detecting and indicating the success or failure of light quantity control in accordance with the illumination mode in which the speed light is operated.

Briefly stated, in accordance with the invention, a device for indicating the impossibility of light quantity control in a direct illumination mode for preset exposure factors and for indicating the non-occurrence of light quantity control in an indirect illumination mode comprises first circuit means for producing a first output signal when a guide number determined by the preset exposure factors is outside of a guide number range in which light quantity control can be effected, second circuit means for producing a second output signal when light quantity control is not effected during an exposure, display means responsive to said output signals, and means for connecting the display means to the first circuit means when the speed light is in the direct illumination mode and for connecting the display means to the second circuit means when the speed light is in the indirect illumination mode.

The invention will become more fully apparent from the following detailed description thereof taken in conjunction with the accompanying drawings.

DESCRIPTION OF THE PREFERRED EMBODIMENT

Figure 1:
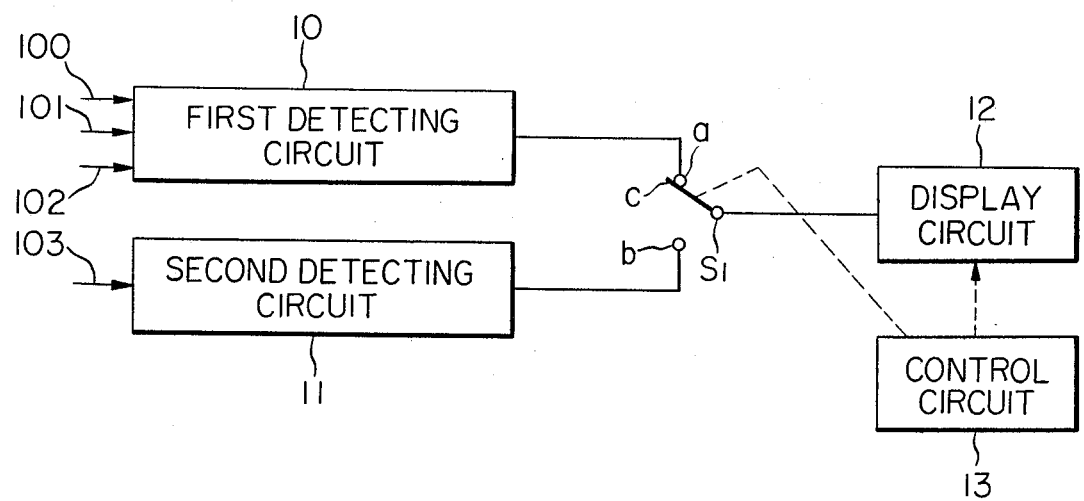
FIG. 1 is a block diagram illustrating the interconnection of various circuits of a device in accordance with the invention.

As shown in FIG. 1, in a device in accordance with the invention, a first detecting circuit 10 has applied thereto electrical signals 100, 101, and 102 corresponding to exposure factors preset on a camera for flash photography. For example, input signal 100 may correspond to the film speed (S), input signal 101 may correspond to the aperture value (A) of the objective lens, and input signal 102 may correspond to the object distance (D). As will be explained, by determining whether or not the guide number (GN) obtained from these preset exposure factors is between a maximum guide number value ($GN_{max}$) and a minimum guide number value ($GN_{min}$) which define a predetermined range of guide numbers in which the quantity of light emitted from an automatic light-quantity-control speed light can be controlled, the first detecting circuit 10 determines in advance of an exposure the possibility or impossibility of light quantity control. If the guide number determined by the preset exposure factors lies between the maximum guide number value and the minimum guide number value, i.e., $GN_{min} \leq GN \leq GN_{max}$, light quantity control is possible. If this condition is not satisfied, light quantity control is impossible for the preset exposure factors.

As will also be explained hereinafter, a second detecting circuit 11 receives an input signal 103 which is produced in the speed light when a light quantity control operation occurs. If the signal 103 is not received by the second detecting circuit during an exposure within the time required for the complete discharge of a main discharge capacitor, the second detecting circuit determines that a light quantity control operation has not occurred.

A display circuit 12 may be selectively connected to the first and second detecting circuits 10 and 11 by a switch $S_1$. When the movable contact c of the switch is connected to a first switch terminal a, the display circuit 12 receives the output from the first detecting circuit 10 and provides an indication of the impossibility of light quantity control prior to an exposure. When the movable contact c is connected to a second terminal b, the display circuit 12 receives the output from the second detecting circuit 11, and indicates the non-occurrence of light quantity control after the exposure (after the emission of light). A control circuit 13 for changing over the operating mode of display circuit 12 in accordance with the terminal selected by switch $S_1$ may also be included, if desired.

Figure 2:
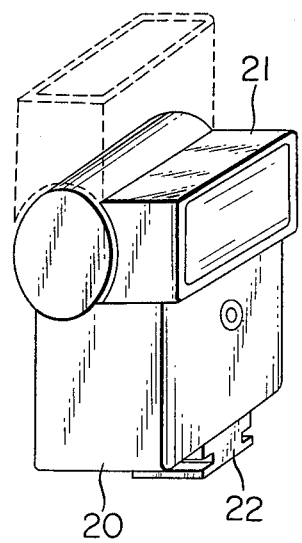
FIG. 2 is a perspective view of an automatic light-quantity-control speed light embodying the invention.

FIG. 2 illustrates an automatic light-quantity-control speed light embodying the invention. As shown, the speed light comprises a light emitting portion 21, including a flash discharge tube rotatably supported on a body portion 20. A mounting leg or foot 22 may be included on the bottom of the body portion to mount the speed light on a camera (not shown) as is well known. The light emitting portion 21 can assume a first position (indicated in solid lines in the figure) for directly illuminating an object being photographed, and can assume second position in which it is rotated from the first position (as shown, for example, in dotted lines in the figure) for indirectly illuminating the object. In the indirect illumination mode, the light emitting portion may be fixed at any desired angle between the first position and the dotted line position shown.

Figure 3:
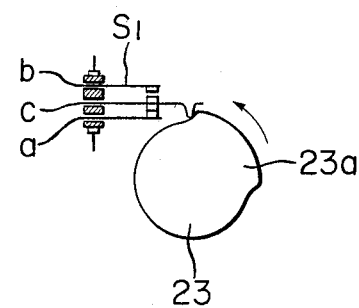
FIG. 3 illustrates a preferred form of a change-over device of the invention.

FIG. 3 illustrates a preferred form of a change-over device for controlling the position of switch $S_1$ to automatically connect the display circuit 12 to the first and second detecting circuits 10 and 11 in accordance with the illumination mode of the speed light. As shown, the device may comprise a cam 23, operatively associated with the light emitting portion 21 and rotatable therewith, against which the movable contact c of switch $S_1$ bears. When the light emitting portion 21 is in its first position (direct illumination mode) the cam is in the position illustrated in FIG. 3 in which the movable contact c engages terminal a of the switch to connect the display circuit to the first detecting circuit. When the light emitting portion 21 is rotated from its first position (indirect illumination mode), cam 23 is rotated counterclockwise, as indicated by the arrow in the figure. As shown, can 23 may have a protuberance 23a which preferably subtends an angle at least equal to the maximum angle through which the light emitting portion may be rotated. When cam 23 is rotated from the position illustrated, movable contact c, which engages protuberance 23a, is connected to terminal b of the switch to connect the display circuit to the second detecting circuit.

The arrangement of cam 23 and switch $S_1$ provides a simple, convenient device for automatically switching the display circuit between the first and second detecting circuits in accordance with the illumination mode in which the speed light is operated, thereby optimizing the indication of the success or failure of light quantity control. In the direct illumination mode, the first detecting circuit determines whether the guide number corresponding to the preset exposure factors is within a predetermined range between a maximum guide number and a minimum guide number in which light quantity control can be effected, and outputs a signal to the display circuit to indicate the impossibility of a proper exposure, prior to the exposure being made. Accordingly, the indication provided by the first detecting circuit is preventive in nature, enabling the preset exposure factors to be varied so that a proper exposure can be obtained. When the speed light is in the indirect illumination mode, the display circuit is automatically connected to the second detecting circuit. If a light quantity control operation does not occur during an exposure, the second detecting circuit outputs a signal to the display circuit for indicating such non-occurrence, thereby enabling the preset exposure factors to be varied so that a proper exposure can be made.

In ordinary flash photography, it is unusual that light quantity control is impossible even for the minimum guide member. Therefore, the first detecting circuit may also be a circuit for determining whether or not the maximum guide number is greater than or equal to the guide number corresponding to the preset exposure factors for indicating only whether or not light quantity control can be effected when full light emission has occurred. In contrast, in close-up photography because of the short object distances involved, it is necessary to determine whether or not the minimun guide number is less than the guide number corresponding to the preset exposure factors. Accordingly, the first detecting circuit may be constructed to detect only one of the three conditions (a) $GN_{min} \leq GN \leq GN_{max}$, (b) $GN_{max} \geq GN$, or (c) $GN_{min} \leq GN$, depending upon the type of objective lens or speed light which is used.

Figure 4:
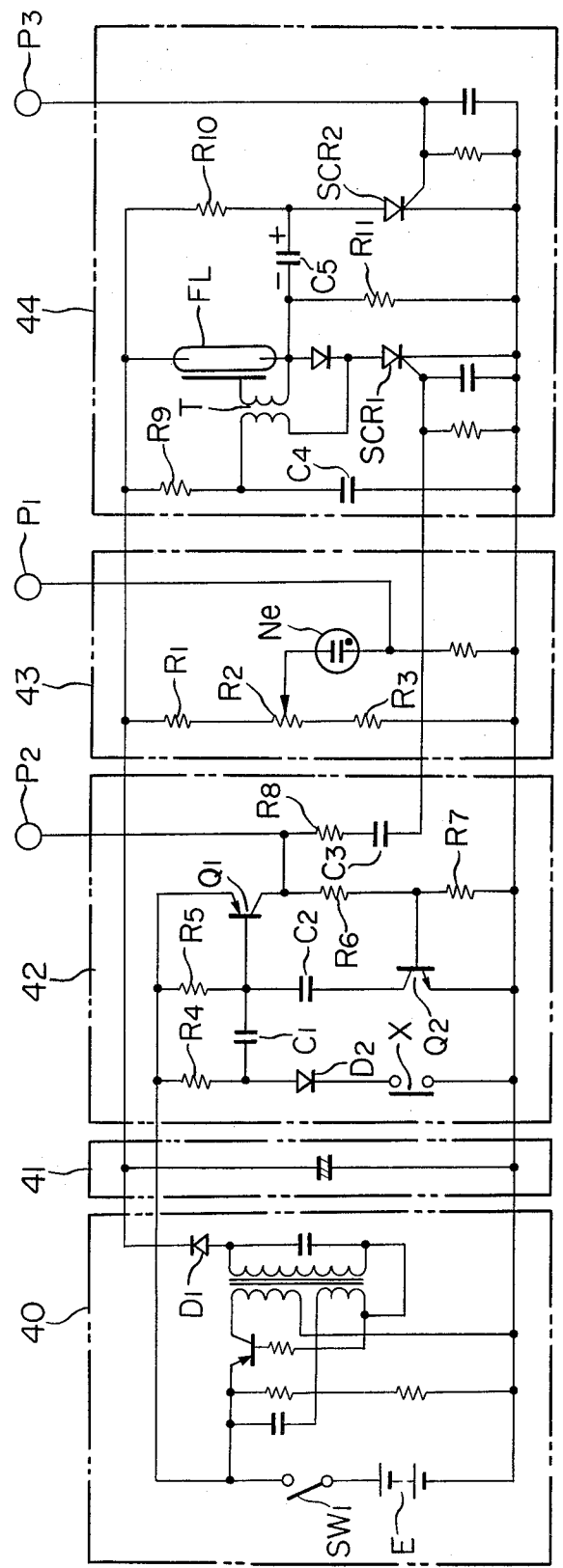
FIGS. 4 and 5 are circuit diagrams illustrating a preferred form of the invention.

The invention will now be described in greater detail with reference to the circuit diagrams of FIGS. 4 and 5. As shown in FIG. 4, the automatic light-quantity-control speed light may include a DC-DC converter 40, a main discharge capacitor 41, a trigger circuit 42, a charging voltage detecting circuit 43 and a light emission control circuit 44. When the main power switch $SW_1$ of the DC-DC converter 40 is closed, a blocking oscillator circuit is operated and the voltage of the DC power source E is transformed into an AC voltage, which is rectified by a diode $D_1$ to provide a higher level DC voltage for charging the main discharge capacitor 41. The charging voltage of capacitor 41 is divided by a voltage dividing circuit comprising resistors R1, R2, and R3 and applied to a neon tube Ne. When the charging of the main discharge capacitor 41 is completed and the stored charge is sufficient for the emission of light from the flash discharge tube FL in the light emission control circuit 44, the neon tube Ne is turned on, causing the output of the voltage dividing circuit ($R_1$-$R_3$) to be output at a terminal $P_1$ which goes "high". Prior to the neon tube Ne turning on, the voltage on terminal $P_1$ is "low".

When the synchro contact X of the camera is closed, a one-shot multivibrator in trigger circuit 42 comprising transistors $Q_1$, $Q_2$, capacitors $C_1$, $C_2$, resistors $R_4$-$R_7$ and diode $D_2$ is triggered, causing transistor $Q_1$ to conduct. When transistor $Q_1$ conducts, the voltage on its collector, which is output on a terminal $P_2$, becomes substantially equal to the DC source voltage E, causing the voltage on terminal $P_2$ to go high. The collector voltage of $Q_1$ is also AC-coupled by resistor $R_8$ and capacitor $C_3$ to the gate of a thristor $SCR_1$. Accordingly, when transistor $Q_1$ turns on, thyristor $SCR_1$ also turns on, providing a discharge path for a trigger capacitor $C_4$ through the primary winding of a trigger transformer T. The high voltage generated in the secondary winding of the trigger transformer turns on the flash discharge tube FL, providing a discharge path for the main discharge capacitor 41, causing the flash discharge tube to emit light for illuminating the object being photograped.

Figure 5:
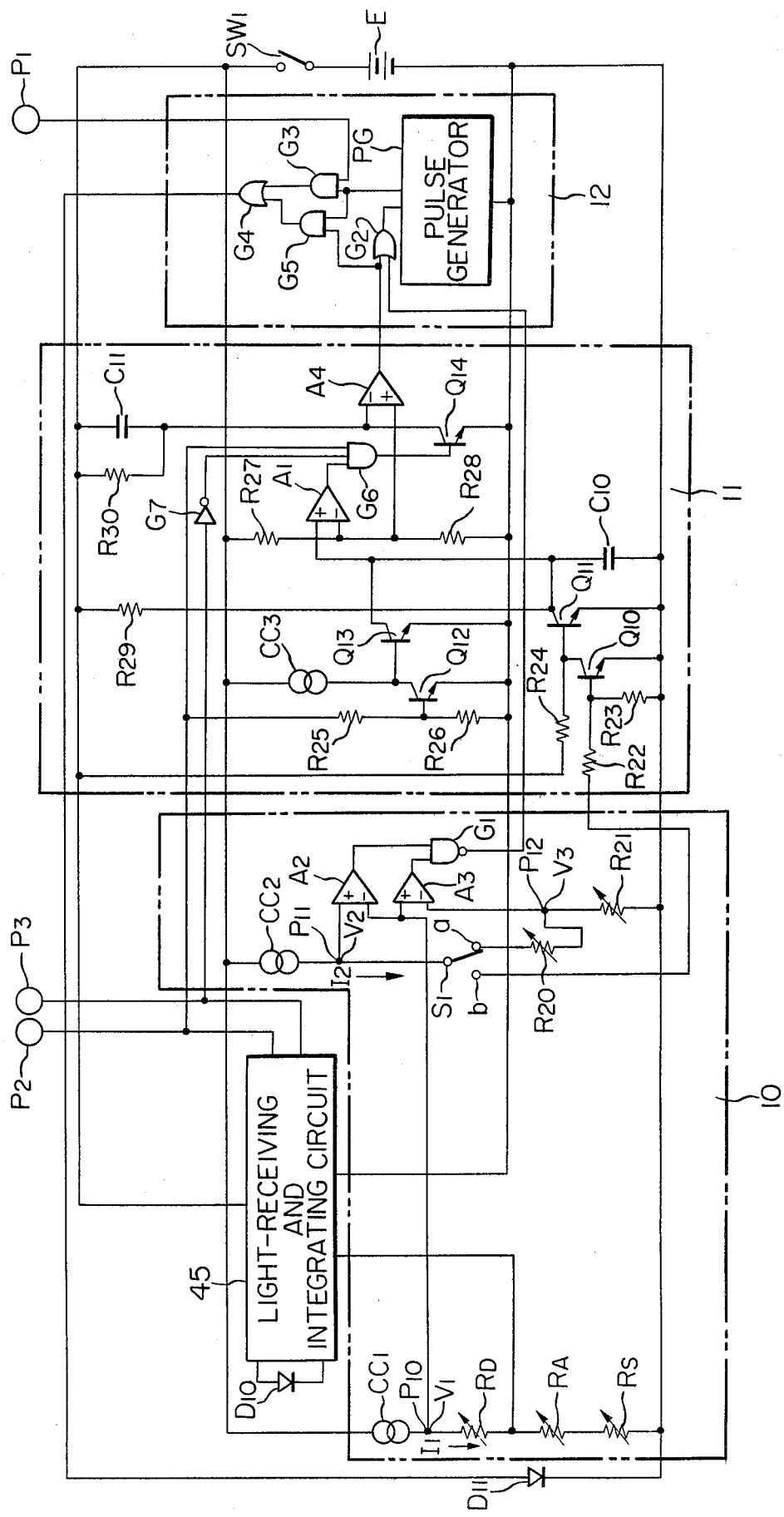

A portion of the light reflected by the object is received by a light receiving element $D_{10}$, which is part of a light receiving and integrating circuit 45, as shown in FIG. 5. As is well known, the light receiving and integrating circuit 45 integrates the current flowing to the light receiving element $D_{10}$, which may be photodiode, by charging an integrating capacitor. When the voltage across the integrating capacitor reaches a predetermined value corresponding to the preset film speed and aperture value, the output voltage on terminal $P_3$ of the light receiving and integrating circuit goes high. This voltage is coupled to a second thyristor $SCR_2$ in the light emission control circuit 44 (FIG. 4) causing the thyristor to turn on. When thyristor $SCR_2$ turns on, a commutation capacitor $C_5$, precharged through resistors $R_{10}$ and $R_{11}$ to the polarity indicated, reverse biases thyristor $SCR_1$, turning it off. As a result, the current flow through the flash discharge tube FL is interrupted and the light emission therefrom is terminated, thereby effecting light quantity control.

The operation of the circuit of FIG. 5 will now be described for the two different illumination modes of the speed light.

1. Direct Illumination Mode

In the direct illumination mode, switch $S_1$ selects terminal a. In this mode, only the first detecting circuit 10 is used, the second detecting circuit 11 does not operate. As shown, a constant current source, $CC_1$ supplies a constant current $I_1$ to a series connection of three variable resistors $R_S$, $R_A$, and $R_D$, the resistance values of which correspond to the film speed, the lens aperture, and the distance to the object being photographed, respectively. Resistors $R_A$ and $R_D$ are typically disposed within the lens barrel of the objective lens, and their resistance values are varied in accordance with the rotation of the aperture ring and the distance ring, respectively. Resistor $R_S$ is typically disposed within the camera, and its resistance value is varied in accordance with the setting of the film speed dial. The voltage $V_1$ across the series connection (at junction $P_{10}$) is applied to the inverting input of a comparator amplifier $A_2$ and to the non-inverting input of a second comparator amplifier $A_3$. A second constant current source $CC_2$ supplies a constant current $I_2$ to a series connection of variable resistors $R_{20}$ and $R_{21}$, connected to terminal a of switch $S_1$. The voltage $V_2$ across this series connection (at junction $R_{11}$) is applied to the non-inverting input of amplifier $A_2$, and the voltage $V_3$ between resistors $R_{20}$ and $R_{21}$ (at junction $P_{12}$) is applied to the inverting input of amplifier $A_3$. For the sake of convenience, it will be assumed that $I_1 = I_2$. Resistors $R_{20}$ and $R_{21}$ are used for selecting the guide number range between $GN_{min}$ and $GN_{max}$ in which the quantity of light emitted by the speed light can be controlled. The voltages $V_1$, $V_2$ and $V_3$ are proportional to the guide number determined by the preset exposure factors, by $GN_{max}$ and by $GN_{min}$, respectively. Amplifiers $A_2$ and $A_3$ form a window comparator which compares the guide number determined by the preset exposure factors with the predetermined guide number range of the speed light. The outputs of these amplifiers are connected to a NAND gate $G_1$, which is used for controlling a pulse generator PG in the display circuit 12, as will be explained.

Now, the guide number may be expressed by the following equation:

$$GN = \sqrt{\frac{Sx}{Sa}} \cdot A \cdot D \quad (1)$$

where
Sx: an arbitrary film speed (ASAx)
Sa: a reference film speed (ASA100)
A: the aperture value of the lens D: the distance to the object.

Taking the logarithms of both sides of equation (1) gives:

$\ln Gn = \frac{1}{2}(\ln Sx) - \frac{1}{2}(\ln Sa) + \ln A + \ln D$ $\ln Gn + \frac{1}{2}(\ln Sa) = \frac{1}{2}(\ln Sx) + \ln A + \ln D. \quad (2)$ To introduce an arbitrary film speed (generally, the speed of the film loaded into the camera) from the variable resistor $R_S$, the resistance value of the resistor $R_S$ is varied with the film speed setting so that $R_S \cdot I_1 = \frac{1}{2}(\ln Sx)$, is satisfied. Likewise, the resistance value of the variable resistor $R_A$ is varied with the aperture value so that $R_A \cdot I_1 = \ln A$, or $R_A = \ln A/I_1$, is satisfied, and the resistance value of the variable resistor $R_D$ is varied with the object distance so that $R_D \cdot I_1 = \ln D$, or $R_D = \ln D/I_1$, is satisfied. Thus, the voltage $V_1$ becomes:

$$(R_S + R_A + R_D) I_1 = \frac{1}{2} (\ln Sx) + \ln A + \ln D \quad (3)$$
$$= \ln GN + \frac{1}{2} (\ln 100),$$

which corresponds to the guide number determined by the preset exposure factors, i.e., film speed, aperture value and object distance.

To set the predetermined guide number range of the speed light, the values of resistors $R_{20}$ and $R_{21}$ are set so that:

$$R_{21} \cdot I_2 = \frac{1}{2}(\ln 100) + \ln GN_{min} \quad (4)$$

$$(R_{21} + R_{20}) \cdot I_2 = \frac{1}{2}(\ln 100) + \ln GN_{max}. \quad (5)$$

By doing so, the voltage $V_2$ at junction $P_{11}$ corresponds to the maximum guide number $GN_{max}$, and the voltage $V_3$ at junction $P_{12}$ corresponds to the minimum guide number $GN_{min}$.

When the guide number GN necessary for a correct exposure, as determined by the preset exposure factors, is greater than the maximum guide number of the speed light, voltage $V_1$ is higher than voltages $V_2$ and $V_3$. Therefore, the output of amplifier $A_2$ is low and the output of amplifier $A_3$ is high. Accordingly, the output of NAND gate $G_1$ is high. When the guide number GN determined by the preset exposure factors is smaller than the minimum guide number of the speed light, voltage $V_1$ is lower than the voltages $V_2$ and $V_3$. Therefore, the output of amplifier $A_2$ is high and the output of amplifier $A_3$ is low, again causing the output of NAND gate $G_1$ to be high. However, when the guide number is between the maximum and the minimum guide numbers of the speed light, voltage V is between voltages $V_2$ and $V_3$. Therefore, the output of both amplifiers $A_2$ and $A_3$ is high, and the output of NAND gate $G_1$ is low.

The output of NAND gate $G_1$ is provided as one input to an OR gate $G_2$, the output of which enables the pulse generator PG. When the output of NAND gate $G_1$ is high (corresponding to the guide number falling outside of the predetermined guide number range of the speed light), the output of OR gate $G_2$ is high, and the pulse generator PG is enabled to output pulses. The output pulses from the pulse generator are supplied to an AND gate $G_3$, along with the output of the charging voltage detector circuit 43 (FIG. 4) on terminal $P_1$. When the charging of the main discharge capacitor 41 has been completed, the voltage on terminal $P_1$ is high, and AND gate $G_3$ outputs the pulses through an OR gate $G_4$ to a light source $D_{11}$, which may be a light emitting diode (LED). The LED may be located, for example, in the viewfinder of the camera. The pulses to LED $D_{11}$ cause the LED to flash on and off, indicating that the guide number determined by the preset exposure factors is outside of the predetermined guide number range for the speed light, thereby giving a preventive indication prior to an exposure of the impossibility of light quantity control for the preset exposure factors.

Moreover, since the output pulses from the pulse generator are applied to the LED through AND gate $G_3$ which must be enabled by a high level voltage on terminal $P_1$ which is produced only when the main discharge capacitor is fully charged, the LED also indicates the charge state of the main discharge capacitor. If it is not desired to indicate the charging state of the capacitor and to indicate only the impossibility of light quantity control the output from the pulse generator can be applied directly to OR gate $G_4$.

2. Indirect Illumination Mode

As previously indicated, in this mode the first detecting circuit 10 is not used, and only the second detecting circuit 11 is operated. When switch $S_1$ selects terminals b, the constant current source $CC_2$ is connected to resistors $R_{22}$ and $R_{23}$, the resistors being selected so that the voltage $V_2$ produced by the constant current $I_2$ is higher than the voltage corresponding to the highest guide number expected, as determined by the commonly used exposure factors. Since the inverting input of amplifier $A_3$ is grounded through resistor $R_{21}$, the output of both amplifiers $A_2$ and $A_3$ is high, and the output of NAND gate $G_1$ is low, so that it has no affect on the pulse generator PG.

The voltage produced by the current $I_2$ flowing through resistors $R_{22}$ and $R_{23}$ turns on transistor $Q_{10}$, grounding the base of transistor $Q_{11}$ and turning it off. When synchro contact X is open, the voltage on terminal $P_2$ is low and transistor $Q_{12}$ is turned off, permitting the base of transistor $Q_{13}$ to be forward biased by a constant current source $CC_3$, turning on transistor $Q_{13}$. The output of transistor $Q_{13}$ is connected to the non-inverting input of an amplifier $A_1$ and across a capacitor $C_{10}$, short circuiting the capacitor when transistor $Q_{13}$ is turned on. The inverting terminal of amplifier $A_1$ is connected to a voltage divider comprising resistors $R_{27}$ and $R_{28}$. Accordingly, when transistor $Q_{13}$ is on, the output of amplifier $A_1$ is low. This output is provided as one of three inputs to an AND gate $G_6$. The other inputs to the gate are the voltage on terminal $P_2$ and the output voltage on terminal $P_3$ from the light receiving and integrating circuit which is inverted by inverter amplifier $G_7$.

Upon closing of the synchro contact X, transistor $Q_{12}$ is turned on and transistor $Q_{13}$ is turned off, allowing capacitor $C_{10}$ to charge through resistor $R_{29}$. The time $T_1$ required for the voltage across capacitor $C_{10}$ to become equal to the input voltage on the inverting input of amplifier $A_1$ produced by voltage divider $R_{27}$, $R_{28}$ is set to be equal to the time required for full light emission from the speed light, i.e., the time required for the main discharge capacitor 41 to completely discharge through the flash discharge tube FL. (Light quantity control is effected during the time $T_1$). Closing of the synchro contact X also operates the one-shot multivibrator of trigger circuit 42 causing the voltage on terminal $P_2$ to go high for a predetermined time $T_2$, which is selected to be longer than the time $T_1$.

During initial charging of capacitor $C_{10}$, the output of amplifier $A_1$ is low. Also, the output on terminal $P_3$ of the light receiving an integrating circuit 45 remains low until the integrated value of the current flowing through the light receiving element $D_{10}$ reaches a predetermined value determined by the preset exposure factors, and, therefore, the output of inverter $G_7$ is high. The voltage on terminal $P_2$ is also high, as just described. However, since the output of amplifier $A_1$ is low, the output of AND gate $G_6$ is also low, which holds transistor $Q_{14}$, connected to the inverting input of an amplifier $A_4$, turned off. Since the inverting input of amplifier $A_4$ is also connectd to the DC power source E through resistor $R_{30}$, the output of the amplifier, which is supplied as a second input to the OR gate $G_2$ of the display circuit 12, is also low. Accordingly, the output of OR gate $G_2$ is low, holding the pulse generator disabled. The output of amplifier $A_4$ is also supplied as an input to an AND gate $G_5$, along with the output from the pulse generator. The output of gate $G_5$ is connected to LED $D_{11}$ through OR gate $G_4$.

At time $T_1$, when the voltage across capacitor $C_{10}$ becomes equal to the voltage on the inverting input of amplifier $A_1$, the output of amplifier $A_1$ goes high. If a light quantity control operation has not occurred during the time period $T_1$, the voltage on terminal $P_3$ remains low. Accordingly, all three inputs to AND gate $G_6$ will be high and transistor $Q_{14}$ will be turned on. This allows capacitor $C_{11}$ to rapidly charge during the time period between $T_2$ and $T_1$, which causes the output of amplifier $A_4$ to go high. This output, which is coupled to the pulse generator through OR gate $G_2$, causes the pulse generator to generate pulses which are coupled through AND gate $G_4$ and OR gate $G_4$ to LED $D_{11}$, causing LED $D_{11}$ to be alternately turned on and off in accordance with the frequency of the pulses, thereby indicating the non-occurrence of light quantity control during the exposure. Accordingly, the flashing LED indicates that the preset exposure factors resulted in an improper exposure and that the exposure factors should be changed and another exposure made. This indication is provided for a predetermined period of time $T_3$ following the turn-off of transistor $Q_{14}$ until capacitor $C_{11}$ discharges through resistor $R_{30}$ and the voltage on the inverting input of amplifier $A_4$ becomes higher than the voltage of voltage divider $R_{27}$ and $R_{28}$, causing its output to go low.

If a light quantity control operation occurs within the time period $T_1$, the output voltage on terminal $P_3$ of the light receiving an integrating circuit 45 goes high. This causes the output of inverter $G_7$ to go low so that AND gate $G_6$ is not enabled when the output of amplifier $A_1$ goes high. Accordingly, the pulse generator is not enabled and the LED is not turned on, thus indicating that a light quantity control operation has occurred. If desired, switch $S_1$ and the pulse generator PG may be operatively associated so that the frequency generated by the pulse generator in the direct illumination mode is different from the frequency generated in the indirect illumination mode. This is convenient for indicating whether the display is produced by the first detecting circuit or the second detecting circuit, i.e., whether the display is preventive or cautionary in nature.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. In an automatic light-quantity-control speed light capable of operating in direct and indirect illumination modes, and in which proper light quantity control requires that the quantity of light emitted by the speed light be automatically controlled to be less than a maximum quantity of light which the speed light is capable of emitting in a predetermined time interval, a device for indicating whether or not proper light quantity control for preset exposure factors can be effected in the direct illumination mode and for indicating whether or not proper light quantity control has been effected in the indirect illumination mode, comprising first circuit means for producing a first output signal when a guide number determined by the preset exposure factors is inside of a guide number range in which proper light quantity control can be effected, and for producing a second output signal when said guide number is outside of said guide number range, second circuit means for producing a third output signal when proper light quantity control has been effected during an exposure, and for generating a fourth output signal when proper light quantity control has not been effected during said exposure, display means adapted to be driven from each of said circuit means for providing said indicating, means for driving said display means in a first drive mode in response to said first output signal and third output signal, and for driving said display means in a second drive mode different from said first drive mode in response to said second output signal and fourth output signal, and means for applying output signals from the first circuit means to the driving means when the speed light is in the direct illumination mode and for applying output signals from the second circuit means to the driving means when the speed light is in the indirect illumination mode.

2. The device of claim 1, wherein the display means comprises a single display element, the applying means includes means for automatically performing said applying in accordance with the illumination mode in which the speed light is operated, and said driving means drives said display element, both in the direct illumination mode and in the indirect illumination mode, in one of the first drive mode and the second drive mode.

3. The device of claim 2, wherein the speed light comprises a light emitting portion rotatably mounted on a body portion, the light emitting portion being in a first position when the speed light is in the direct illumination mode and being rotated from said first position when the speed light is in the indirect illumination mode, and wherein said performing means is a switch operated by the rotation of the light emitting portion.

4. The device of claim 3, wherein the switch has a contact movable between first and second switch positions, and the applying means further comprises a cam member coupled to the light emitting portion and rotatable therewith, the cam member being engageable with the contact and operable to move the contact from said first switch position to said second switch position when the light emitting portion is rotated from its first position.

5. The device of claim 1, wherein the first circuit means comprises means for detecting whether the guide number determined by the preset exposure factors is less than a minimum guide number for which proper light quantity control can be effected, and means for detecting whether the guide number determined by the preset exposure factors is greater than a maximum guide number for which proper light quantity control can be effected.

6. The device of claim 1, wherein the first circuit means comprises means for detecting whether the guide number determined by the preset exposure factors lies between a minimum guide number and a maximum guide number, the minimum guide number and the maximum guide number defining said guide number range.

7. The device of claim 2, wherein the display means comprises a light source, and the driving means comprises pulse generator means for turning the light source on and off.

8. The device of claim 7, wherein the speed light comprises a flash discharge tube and a capacitor adapted to be charged and subsequently discharged through the flash discharge tube to cause the flash discharge tube to emit light, and wherein the driving means comprises means for turning the light source on in response to the state of charging of the capacitor.

9. The device of claim 1, wherein the first circuit means comprises means for generating a first voltage proportional to the guide number determined by the preset exposure factors, means for generating second and third voltages corresponding to a maximum guide number and a minimum guide number, respectively, between which proper light quantity control can be effected, and means for comparing said first voltage with said second and third voltages to produce said first output signal.

10. The device of claim 9, wherein the comparing means comprise first and second amplifier means having outputs connected to digital logic gate means, said first output signal being derived from the output of said gate means.

11. The device of claim 1, wherein the speed light comprises a flash discharge tube, a capacitor adapted to be discharged through the flash discharge tube for causing the flash discharge tube to emit light, means for measuring the quantity of emitted light reflected by an object being photographed, and means responsive to said measuring means for interrupting the current flow from the capacitor to the flash discharge tube to limit the quantity of light emitted thereby, and wherein the second circuit means comprises means responsive to said measuring means for detecting whether said interrupting means operates prior to the completion of the discharge of the capacitor through the flash discharge tube and for producing said second output signal.

12. The device of claim 9, wherein the driving means comprises pulse generator means responsive to said output signals and the display means is controlled by the output of the pulse generator means.

13. For use in combination with a camera and an automatic light-quantity-control speed light capable of operating in direct and indirect illumination modes, and in which proper light quantity control requires that the quantity of light emitted by the speed light be automatically controlled to be less than a maximum quantity of light which the speed light is capable of emitting in a predetermined time interval, a device for indicating whether or not proper light quantity control for preset exposure factors can be effected in the direct illumination mode and for indicating whether or not proper light quantity control has been effected in the indirect illumination mode, comprising first circuit means for producing a first output signal representative of the fact that a guide number determined by the preset exposure factors is inside of a guide number range in which proper light quantity control can be effected, and for producing a second output signal representative of the fact that said guide number is outside of said guide number range, second circuit means for producing a third output signal representative of the fact that proper light quantity control has been effected during an exposure, and for generating a fourth output signal representative of the fact that proper light quantity control has not been effected during said exposure, display means adapted to be driven from each of said circuit means and adapted for use in the camera for providing said indicating, means for driving said display means in a first drive mode in response to said first output signal and third output signal, and for driving said display means in a second drive mode different from said first drive mode in response to said second output signal and fourth output signal, and means for applying output signals from the first circuit means to the driving means when the speed light is in the direct illumination mode and for applying output signals from the second circuit means to the driving means when the speed light is in the indirect illumination mode.

14. The device of claim 13, wherein the display means comprises a single display element, the applying means includes means for automatically performing said applying in accordance with the illumination mode in which the speed light is operated, and said driving means drives said display element, both in the direct illumination mode and in the indirect illumination mode, in one of the first drive mode and the second drive mode.

15. In an automatic light-quantity-control speed light having a change-over means for selecting one of a direct illumination mode and an indirect illumination mode of the speed light, and in which proper light quantity control requires that the quantity of light emitted by the speed light be automatically controlled to be less than a maximum quantity of light which the speed light is capable of emitting in a predetermined time interval, a device for indicating whether or not proper light quantity control for preset exposure factors can be effected in the direct illumination mode and for indicating whether or not proper light quantity control has been effected in the indirect illumination mode, comprising first circuit means for producing a first output signal representative of the fact that a guide number determined by the preset exposure factors is inside of a guide number range in which proper light quantity control can be effected, and for producing a second output signal representative of the fact that said guide number is outside of said guide number range, second circuit means for producing a third output signal representative of the fact that proper light quantity control has been effected during an exposure, and for generating a fourth output signal representative of the fact that proper light quantity control has not been effected during said exposure, display means adapted to be driven from each of said circuit means for providing said indicating, and means interconnected with the change-over means for applying output signals from the first circuit means to the display means when the change-over means selects the direct illumination mode, and for applying output signals from the second circuit means to the display means when the change-over means selects the indirect illumination mode.

* * * * *